United States Patent
Moorer, Jr. et al.

(10) Patent No.: US 8,205,838 B2
(45) Date of Patent: Jun. 26, 2012

(54) ELECTROSTATIC SPACECRAFT REORBITER

(76) Inventors: Daniel F. Moorer, Jr., Boulder, CO (US); Hanspeter Schaub, Golden, CO (US)

(*) Notice: Subject to any disclaimer, the term of this patent is extended or adjusted under 35 U.S.C. 154(b) by 137 days.

(21) Appl. No.: 12/820,548

(22) Filed: Jun. 22, 2010

(65) Prior Publication Data

US 2011/0036952 A1     Feb. 17, 2011

Related U.S. Application Data

(63) Continuation-in-part of application No. 12/541,081, filed on Aug. 13, 2009.

(51) Int. Cl.
*B64G 1/10* (2006.01)

(52) U.S. Cl. ............... 244/158.6; 244/158.4; 244/158.5; 244/165; 244/172.4

(58) Field of Classification Search .... 244/158.4–158.6, 244/166, 172.4
See application file for complete search history.

(56) References Cited

U.S. PATENT DOCUMENTS

| | | | |
|---|---|---|---|
| 4,143,314 A | 3/1979 | Gruber | |
| 4,328,667 A | 5/1982 | Valentian et al. | |
| 4,825,646 A | 5/1989 | Challoner et al. | |
| 5,020,746 A | 6/1991 | Anzel | |
| 5,146,742 A | 9/1992 | Iida et al. | |
| 5,696,429 A | 12/1997 | Williamson et al. | |
| 5,826,831 A | 10/1998 | Anzel | |
| 6,036,143 A * | 3/2000 | Biber | 244/169 |
| 6,089,510 A * | 7/2000 | Villani et al. | 244/166 |
| 6,145,298 A | 11/2000 | Burton, Jr. | |
| 6,177,629 B1 * | 1/2001 | Katz | 136/244 |
| 6,266,142 B1 | 7/2001 | Junkins et al. | |
| 6,293,090 B1 | 9/2001 | Olson | |
| 6,332,590 B1 * | 12/2001 | Oh | 244/158.1 |
| 6,336,318 B1 | 1/2002 | Falce et al. | |
| 6,732,978 B2 * | 5/2004 | Ockels et al. | 244/171.1 |
| 6,844,714 B2 | 1/2005 | Balmain et al. | |
| 7,306,189 B2 | 12/2007 | Dressler | |
| 7,395,656 B2 | 7/2008 | Rooney | |
| 7,464,902 B2 * | 12/2008 | Leyre et al. | 244/173.3 |
| 7,484,690 B2 | 2/2009 | D'Ausilio et al. | |
| 2005/0073322 A1 * | 4/2005 | Hibbs et al. | 324/658 |

OTHER PUBLICATIONS

International Search Report and Written Opinion for International Application No. PCT/US2010/045189, mailed Oct. 6, 2010, 8 pages.
H. Schaub, S. R. Vadali, J. L. Junkins and K. T. Alfriend, "Spacecraft Formation Flying Control Using Mean Orbit Elements," *AAS Journal of Astronautical Sciences*, vol. 48, No. 1, pp. 69-87 (2000).

(Continued)

*Primary Examiner* — Tien Dinh
*Assistant Examiner* — Justin Benedik
(74) *Attorney, Agent, or Firm* — Sheridan Ross P.C.

(57) ABSTRACT

Spacecraft vehicles and methods for providing reorbiters capable of moving target objects are provided. More particularly, a reorbiter utilizing electrostatic or Coulomb force for acting on target objects and for moving the target objects into new orbits or altitudes are provided. The reorbiter may establish an electrostatic force by controlling the electrical potential of the reorbiter through active charge emission. The target object may acquire an electrical potential due to its interaction with the space plasma and photoelectrons or the reorbiter may impart additional charge to the target object. After establishing the electrostatic force, a propulsion system of the reorbiter is operated to provide thrust. Thrust is directed to change the orbit and/or position of the target object that is being moved by the electrostatic force between the reorbiter and the target object.

21 Claims, 13 Drawing Sheets

OTHER PUBLICATIONS

H. Schaub and K. T. Alfriend, "Impulsive Feedback Control to Establish Specific Mean Orbit Elements of Spacecraft Formations," AIAA Journal of Guidance, Navigation and Control, vol. 24, No. 4, pp. 739-745 (2001).

K. T. Alfriend and H. Schaub, "Dynamics and Control of Spacecraft Formations: Challenges and Some Solutions," AAS Journal of Astronautical Sciences, vol. 48, No. 2, pp. 249-267 (2000).

K. T. Alfriend, S. R. Vadali and H. Schaub, "Formation Flying Satellites: Control by an Astrodynamicist," *Celestial Mechanics and Dynamical Astronomy*, vol. 81, Nos. 1-2, pp. 57-62 (2001).

H. Schaub and K. T. Alfriend, "Hybrid Cartesian and Orbit Element Feedback Law for Formation Flying Spacecraft," *AIAA Journal of Guidance, Navigation and Control*, vol. 25, No. 2, pp. 387-393 (2002).

H. Schaub, G. G. Parker and L. B. King, "Challenges and Prospects of Coulomb Spacecraft Formations," *AAS Journal of Astronautical Sciences*, vol. 52, Nos. 1-2, pp. 169-193 (2004).

H. Schaub, "Stabilization of Satellite Motion Relative to a Coulomb Spacecraft Formation," *AIAA Journal of Guidance, Navigation and Control*, vol. 28, No. 6, pp. 831-839 (2006).

H. Joe, H. Schaub, and G. G. Parker, "Formation Dynamics of Coulomb Satellites," 6th International Conference on Dynamics and Control of Systems and Structures in Space, Cinque Terre, Liguria, Italy, 14 pgs. (2004).

H. Schaub and M. Kim, "Differential Orbit Element Constraints for Coulomb Satellite Formations," AAS/AIAA Astrodynamics Specialist Conference, Providence, Rhode Island, Paper No. 04-5213, pp. 1-14 (2004).

G. G. Parker, C. Passerello, and H. Schaub, "Static Formation Control Using Interspacecraft Coulomb Forces," 2nd International Symposium on Formation Flying, Washington, D.C., pp. 1-8 (2004).

J. Berryman and H. Schaub, "Static Equilibrium Configurations in GEO Coulomb Spacecraft Formations," 15th AAS/AIAA Space Flight Mechanics Meeting, Copper Mountain, CO, Paper No. 05-104, pp. 1-18 (2005).

A. Natarajan and H. Schaub, "Linear Dynamics and Stability Analysis of a Two-Craft Coulomb Tether Formation," *AIAA Journal of Guidance, Navigation and Control*, vol. 29, No. 4, pp. 831-839 (2006).

H. Schaub, C. D. Hall, and J. Berryman, "Necessary Conditions for Circularly-Restricted Static Coulomb Formations," *AAS Journal of Astronautical Sciences*, vol. 54, Nos. 3-4, pp. 525-541 (2006).

J. Berryman and H. Schaub, "Analytical Charge Analysis for 2- and 3-Craft Coulomb Formations," *AIAA Journal of Guidance, Navigation and Control*, vol. 30, No. 6, pp. 1701-1710 (2007).

I. Hussein and H. Schaub, "Invariant Shape Solutions of the Spinning Three Craft Coulomb Tether Problem," *Journal of Celestial Mechanics and Dynamical Astronomy*, vol. 96, No. 2, pp. 137-157 (2006).

C. C. Romanelli, A. Natarajan, H. Schaub, G. G. Parker, and L. B. King, "Coulomb Spacecraft Voltage Study Due to Differential Orbital Perturbations," 2006 AAS/AIAA Space Flight Mechanics Meeting, Tampa Florida, Paper No. AAS 06-123, pp. 1-20 (2006).

A. Natarajan, H. Schaub, and G. G. Parker, "Reconfiguration of a Nadir-Pointing 2-Craft Coulomb Tether," *Journal of British Interplanetary Society*, vol. 60, No. 6, pp. 209-218 (2007).

G. G. Parker, H. Schaub, A. Natarajan and L. B. King "Coulomb Force Virtual Space Structures," Workshop on Innovative Systems Concepts, ESTEC, Noordwjik, The Netherlands, pp. 39-44 (2006).

G. G. Parker, L. B. King, and H. Schaub, "Charge Determination for Specified Shape Coulomb Force Virtual Structures," 47th AIAA/ASME/ASCE/AHS/ASC Structures, Structural Dynamics, and Materials Conference, Newport, Rhode Island, Paper No. AIAA 2006-1891, pp. 1-8 (2006).

G. G. Parker, L. B. King, and H. Schaub, "Steered Spacecraft Deployment Using Interspacecraft Coulomb Forces," 2006 American Control Conference, Minneapolis, Minnesota, Paper WeC10.5 (2006).

S. Wang and H. Schaub, "One-Dimensional 3-Craft Coulomb Structure Control," 7th International Conference on Dynamics and Control of Systems and Structures in Space, Greenwich, England, 10 pgs. (2006).

A. Natarajan and H. Schaub, "Hybrid Control of Orbit Normal and Along-Track Two-Craft Coulomb Tethers," *Aerospace Science and Technology*, vol. 13, Nos. 4-5, pp. 183-191 (2009).

S. Wang and H. Schaub, "Spacecraft Collision Avoidance Using Coulomb Forces With Separation Distance Feedback," 16th AAS/AIAA Space Flight Mechanics Meeting, Sedona, Arizona, Paper No. AAS 07-112, pp. 1-20 (2007).

V. Lappas, C. M. Saaj, D. Richie, M. Peck, B. Streetman, and H. Schaub, "Spacecraft Formation Flying and Reconfiguration with Electrostatic Forces," AAS/AIAA Space Flight Mechanics Meeting, Sedona, Arizona, Paper No. AAS 07-113, pp. 1-9 (2007).

H. Schaub and I. I. Hussein, "Stability and Reconfiguration Analysis of a Circulary Spinning 2-Craft Coulomb Tether," IEEE Aerospace Conference, Big Sky, MT, pp. 1-11 (2007).

C. M. Saaj, V. Lappas, D. Richie and H. Schaub, "Hybrid Propulsion using Electrostatic Forces for Spacecraft Swarms," European Control Conference, Kos, Greece, Paper WeC03.1, 8 pgs. (2007).

H. Vasavada and H. Schaub, "Analytic Solutions for Equal Mass 4-Craft Static Coulomb Formation," *Journal of Astronautical Sciences*, vol. 56, No. 1, pp. 7-40 (2008).

S. Wang and H. Schaub, "1-D Constrained Coulomb Structure Stabilization With Charge Saturation," AAS/AIAA Astrodynamics Specialist Conference, Mackinac Island, MI, Paper No. 07-267, pp. 1-18 (2007).

I. I. Hussein and H. Schaub, "Stability and Control of Relative Equilibria for the Three-Spacecraft Coulomb Tether Problem," AAS/AIAA Astrodynamics Specialist Conference, Mackinac Island, MI, Paper No. 07-269, pp. 1-19 (2007).

A. Natarajan and H. Schaub, "Orbit-Nadir Aligned Coulomb Tether Reconfiguration Analysis," 18th AAS/AIAA Space Flight Mechanics Meeting, Galveston, Texas, Paper No. 08-149, pp. 1-19 (2008).

S. Wang and H. Schaub, "Open-Loop Electrostatic Spacecraft Collision Avoidance using Patched Conics Analysis," AAS/AIAA Space Flight Mechanics Meeting, Galveston, Texas, Paper No. 08-207, pp. 1-16 (2008).

C. R. Seubert and H. Schaub, "Tethered Coulomb Structures: Prospects and Challenges," AAS F. Landis Markley Astrodynamics Symposium, Cambridge, Maryland, Paper No. 08-269, pp. 1-20 (2008).

S. Wang and H. Schaub, "Electrostatic Spacecraft Collision Avoidance Using Piece-Wise Constant Charges," AAS/AIAA Space Flight Mechanics Meeting, Savannah, Georgia, Paper No. AAS 09-184, pp. 1-20 (2009).

C. R. Seubert and H. Schaub, "One-Dimensional Test Bed for Coulomb Controlled Spacecraft," AAS/AIAA Space Flight Mechanics Meeting, Savannah, Georgia, Paper No. AAS 09-115, pp. 1-17 (2009).

S. Wang and H. Schaub, "Switched Lyapunov Function Based Coulomb Control of a Triangular 3-Vehicle Cluster," AAS/AIAA Astrodynamics Specialist Conference, Pittsburgh, PA, Paper No. AAS 09-391, pp. 1-20 (2009).

S. Wang and H. Schaub, "Nonlinear Coulomb Feedback Control of a Spinning Two Spacecraft Virtual Structure," AAS/AIAA Astrodynamics Specialist Conference, Pittsburgh, PA, Paper No. AAS 09-393, pp. 1-17 (2009).

C. Seubert and H. Schaub, "Closed-Loop One-Dimensional Charged Relative Motion Experiments Simulating Constrained Orbital Motion," AAS/AIAA Astrodynamics Specialist Conference, Pittsburgh, PA, Paper No. AAS 09-390, pp. 1-18 (2009).

C. M. Saaj, V. Lappas, D. Richie, V. Gazi, and H. Schaub, "Satellite Formation Flying: Robust Algorithms for Propulsion, Path Planning and Control," Submitted to the European Control Conference, Budapest, Hungary, 9 pgs. (2009).

M. Kim and H. Schaub, "Spacecraft Collision Avoidance Using Coulomb Forces with Separation Distance Feedback," *Proceedings of the Institution of Mechanical Engineers, Part G: Journal of Aerospace Engineering*, vol. 220, No. 5, pp. 463-474 (2006).

H. Schaub, G. G. Parker, and L. B. King, "Coulomb Thrusting Application Study," Technical Report, Virginia Tech, Aerospace and Ocean Engineering Department, Blacksburg, VA, Report No. A261344, 120 pgs. (2006).

L. King, G. Parker, S. Deshmukh, and J. Chong, "Spacecraft Formation-Flying Using Inter-Vehicle Coulomb Forces," Michigan Technological University, Final Report, 103 pgs. (2002).

K. Torkar et al., "Spacecraft Potential Control Aboard Equator-S as a Test for Cluster-II," *Annales Geophysicae*, vol. 17, pp. 1582-1591 (1999).

K. Torkar et al., "Spacecraft Potential Control Using Indium Ion Sources—Experience and Outlook Based on Six Years of Operation in Space," 6th Spacecraft Charging Technology Conference, AFRL-VS-TR-20001578, pp. 27-32 (2000).

H. Schaub, "Coulomb Craft Test Bed," available at http://homepage.mac.com/hanspeterschaub/work/CoulombTestbed.html, 3 pgs. (2009).

H. Schaub, "Coulomb Formation Flying," available at http://homepage.mac.com/hanspeterschaub/work/cff.html, 3 pgs. (2009).

Author Unknown, "NSTAR Ion Engine," available at http://www.boeing.com/defense-space/space/bss/factsheets/xips/nstar/ionengine.html, 3 pgs. (2009).

W. Riedler et al., "Active Spacecraft Potential Control," *Space Science Reviews*, vol. 79, pp. 271-302 (1997).

International Preliminary Report on Pataentability for International Application No. PCT/US2010/045189, mailed Feb. 23, 2012, 7 pages.

Official Action for U.S. Appl. No. 12/541,081, mailed Jan. 9, 2012, 18 pages.

* cited by examiner

ELECTROSTATIC SPACECRAFT REORBITER

CROSS REFERENCE TO RELATED APPLICATIONS

This patent application is a continuation-in-part of U.S. patent application Ser. No. 12/541,081, filed Aug. 13, 2009, entitled "Hybrid Electrostatic Space Tug", which is incorporated by reference in its entirety herein.

FIELD

A spacecraft reorbiter for altering the altitude of a target object is provided. More particularly, a spacecraft reorbiter that utilizes an electrostatic force to alter the altitude of a target object is provided.

BACKGROUND

The Geostationary Earth Orbit (GEO) belt is becoming very crowded with communication and science satellites. If a satellite breaks down, or reaches its end of life without exiting the GEO belt, then the satellite continues to occupy a valuable GEO slot. In addition, without further orbit control, these satellites will drift due to lunar and solar radiation disturbances, allowing them to wander the GEO belt and interfere with other satellites.

The current practice is to have a satellite, at its end of life, use its remaining fuel to exit the GEO belt to a super-geosynchronous orbit. However, this requires that the payload of the satellite include fuel for this purpose. As a result, the mass of the satellite for a given mission is increased. In addition, older satellites may not have made provisions for achieving a super-geosynchronous orbit, or through accident or the accumulated effect of maneuvers during the satellite's lifetime, there may otherwise be insufficient fuel to place the satellite in a super-geosynchronous orbit. There also is a need to remove malfunctioning satellites or debris from desirable orbits, to allow those orbits to be occupied by functioning satellites, or to move potentially dangerous debris to safer orbits.

In order to remove defunct satellites from desirable orbits, space tugs equipped with docking hardware have been proposed. Such vehicles would operate by physically grasping and holding a target satellite, and then moving that target satellite while it is attached to the space tug. Although simple in concept, a space tug that grabs hold of a target satellite is difficult to implement. In particular, it requires that the space tug maneuver into the immediate proximity of the target vehicle. The space tug must then grab hold of some component or section of the target vehicle that is sufficiently robust to allow the space tug to pull on that component to change the altitude of the target vehicle. This process is often complicated by the rotation or spin of the target vehicle and/or other motion of the target vehicle relative to the space tug. In addition, the space tug is required to precisely maneuver itself into very close proximity to the target vehicle.

Prior art systems for spacecraft formation-shape maintenance have been described by Coulomb Formation Flying ("CFF"). CFF systems are designed to maintain a specific orientation or geometry of the spacecraft comprising the formation. CFF systems examine how to maintain a specific formation orientation or geometry by evaluating how to use electrostatic forces to control the relative positioning of the spacecraft. With CFF systems, the formation center-of-mass orbit motion is not influenced to the first order by the formation's internal Coulomb forces. In addition, with CFF systems, all of the vehicles actively control their own charge in a collaborative manner.

SUMMARY

Embodiments of the disclosed invention are directed to solving these and other problems and disadvantages of the prior art. The reorbiter solution presented here employs active charge control with a non-cooperative object while employing inertial thrusters to change the object's orbital parameters, employing charge control in a non-collaborative manner. In particular, embodiments of the present invention provide a spacecraft reorbiter (hereinafter, "reorbiter") that uses a hybrid blend of Coulomb and inertial forces to move a target vehicle, debris, or other object (hereinafter, "target object"). More particularly, a reorbiter in accordance with embodiments of the present invention uses active charge control to create an absolute electrical potential on the reorbiter, creating an electrostatic force between the reorbiter and the target object. The reorbiter may contain a single charge surface, or a system of multiple charge surfaces. The attractive or repulsive forces between the reorbiter and the target object allow the reorbiter to move the target object to a desired location or orbit.

In accordance with further embodiments of the present invention, the reorbiter performs active charge control by emitting charged particles to control the electrostatic potential of the reorbiter. For example, if the electrical potential of the reorbiter is required to be more negative, the active charge control system can emit positive ions. If the electrical potential of the reorbiter needs to be more positive, the active charge control system can emit negative electrons. The target object can acquire an absolute charge due to its interaction with the space plasma and the photoelectron effect. Alternatively and in accordance with further embodiments of the present invention, the reorbiter can impart additional charge to the target object by using a wireless charge transfer, such as charge beaming to aim the reorbiter charge emission at the target object so that the target object acquires an absolute charge. In another alternative embodiment of the present invention, the reorbiter can impart additional charge to the target object by using a wired charge transfer, such as a tether or other wired connection. In yet another alternative embodiment of the present invention, the target object can acquire an absolute charge by docking with a free flying active charging craft. In accordance with still further embodiments of the present invention, the reorbiter will incorporate an efficient inertial thruster system such as, for example, an electric propulsion system. The electric propulsion system may share components with the active charge control system. Therefore, the hybrid electrostatic reorbiter may utilize electrostatic forces to move a target object and inertial thrusters to change the orbit of the two-craft (reorbiter and target object) system.

Further embodiments of the disclosed invention comprise methods for altering the location or altitude of a target object or spacecraft. These methods may include approaching the target object with a reorbiter, and controlling the electrical potential of the reorbiter to establish an electrostatic force between the reorbiter and the target object. The method further includes applying a propulsive force after establishing the electrostatic force. The electrostatic reorbiter can use attractive forces to pull, or repulsive forces to push, or combinations of attractive and repulsive forces to move the target object to a new orbit. The method can also include maneuvering the reorbiter to within the vicinity of a target object, determining an electrical potential of the reorbiter, and determining an electrical potential of the target object.

Additional features and advantages of embodiments of the disclosed invention will become more readily apparent from the following description, particularly when taken together with the accompanying drawings.

DETAILED DESCRIPTION

Figure 1A:
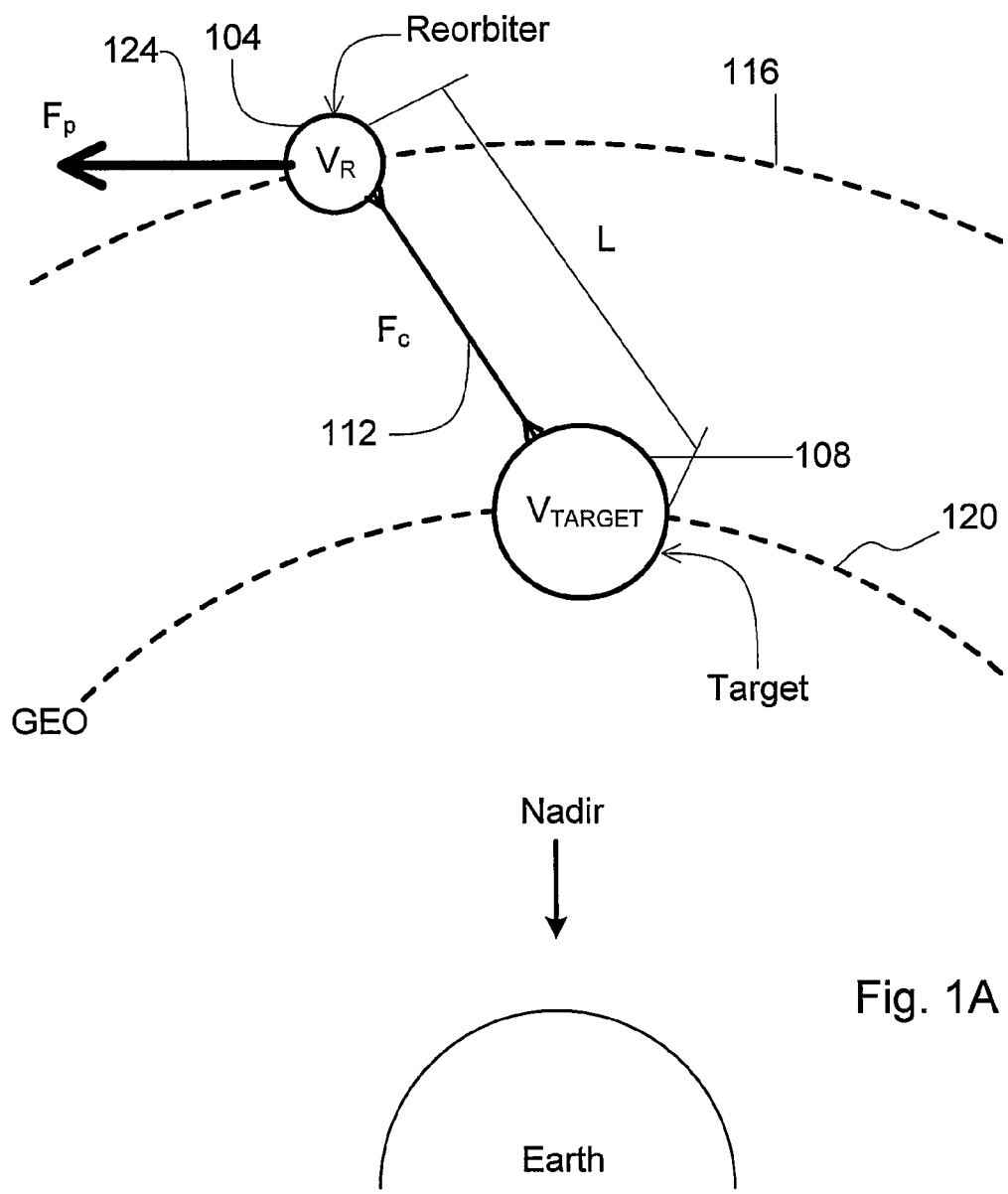
FIGS. 1A-1E depict various relationships between a reorbiter and a target object in accordance with embodiments of the present invention.

FIG. 1A depicts a reorbiter 104 in accordance with embodiments of the present invention, and the relationship of that reorbiter 104 to a target object, spacecraft, or vehicle 108. The reorbiter 104 may approach the target object 108 from a higher orbit and then initiate an orbital maneuver or rendezvous approach to arrive at the same or similar orbit of the target object 108 such that the reorbiter 104 approaches the target object 108 until it reaches a desired distance. After the rendezvous approach, the reorbiter 104 may execute station-keeping maneuvers to keep the reorbiter 104 in a desired orbit, for example, by using reaction control thrusters. Further, after the rendezvous approach and/or station-keeping maneuvers, the two spacecraft or other objects do not need to dock, or otherwise physically connect because the reorbiter 104 creates an electrostatic force between the two spacecraft or other objects.

Figure 2:
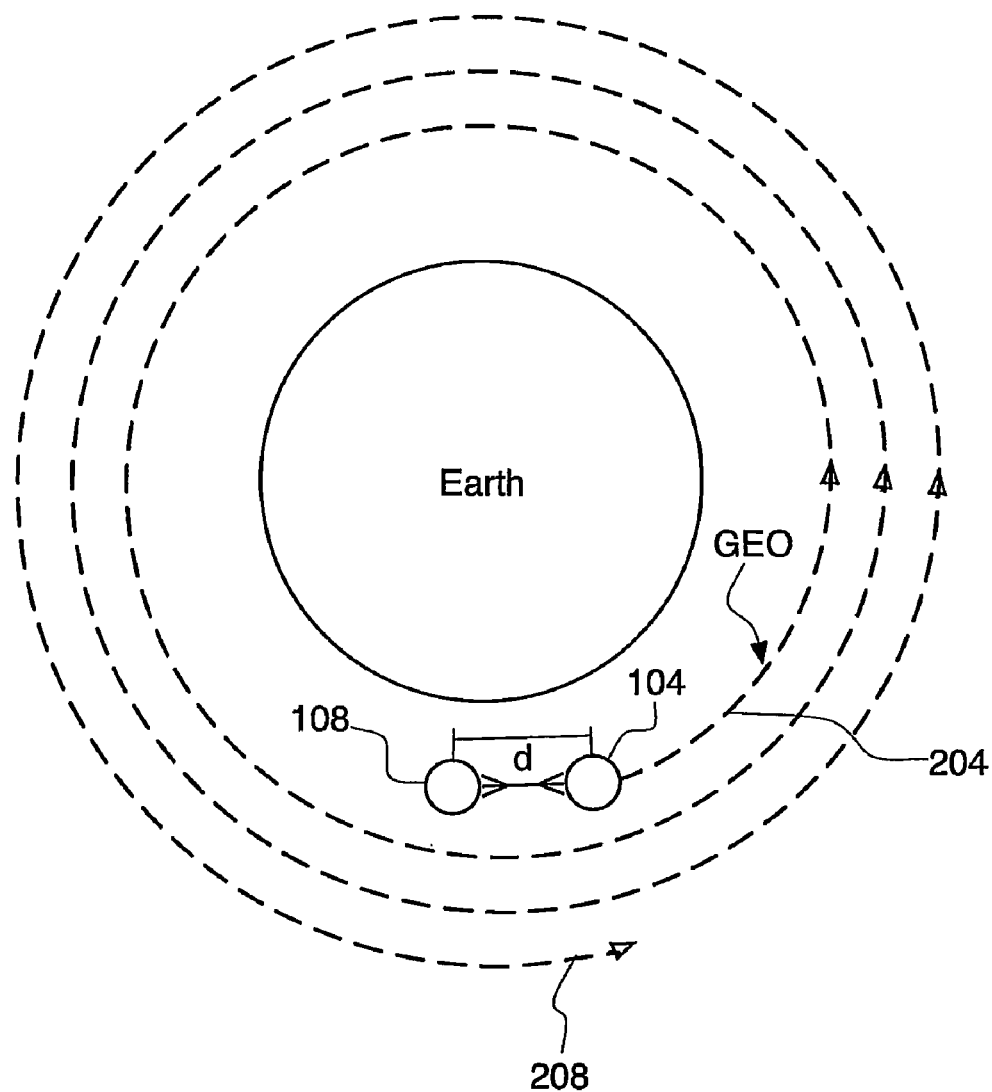
FIG. 2 depicts the transfer of a target object to a new orbit using a reorbiter in accordance with embodiments of the present invention.

More particularly, the reorbiter 104 has an electrical potential or voltage $V_R$ that is either opposite the electrical potential or voltage $V_{Target}$ of the target object 108 to create an attractive force, or of equal charge polarity to create a repulsive force. The reorbiter may comprise several charged sub-systems which could create combinations of attractive and repulsive forces. In addition, any charged sub-systems may be isolated from the main spacecraft bus and include separate charge surfaces. These voltages create an electrostatic force 112 between the reorbiter 104 and the target object 108. As shown, the reorbiter 104 is generally following an orbit 116 that is similar to the orbit 120 of the target object 108. To pull, the reorbiter would be leading the target object in the orbit along-track direction, and to push, the reorbiter would be trailing the target object. Non-along-track reorbiter positions can be used to create arbitrary electrostatic force directions to help stabilize the target object motion to a desired new orbit. Moreover, by applying a propulsive force $F_p$ 124, the reorbiter 104 can alter its orbit and the orbit of the target object 108. For instance, as illustrated in FIG. 2, over a series of orbital periods, the reorbiter 104, applying a relatively small propulsive force $F_p$ 124, can move the target object 108 from a first orbit (e.g., a geosynchronous orbit (GEO)) 204 to a second orbit (e.g., to a super-geosynchronous orbit) 208.

In general, the magnitude of the electrostatic tractor force or Coulomb force $F_c$ 112 is given by:

$$|F_c| = k_c \frac{q_1 q_2}{L^2} e^{-\frac{L}{\lambda_d}} \left(1 + \frac{L}{\lambda_d}\right)$$

where $q_i$ is the vehicle charge level, L is the separation distance, and $\lambda_d$ is the plasma Debye length. As can be appreciated by one of skill in the art, Debye charge shielding causes the electrostatic interaction between two craft to be partially shielded due to the interaction with the local space plasma. However, at GEO, the Debye lengths average about 180 meters, with a range of between 100 and 1000 meters. Thus, a reorbiter 104 using active charge control as disclosed herein to establish and/or maintain an electrostatic force 112 between the reorbiter 104 and a target object 108 at ranges of, for example, 10 to 50 meters, is well within the Debye length of a charge at such altitudes.

Figure 1B:
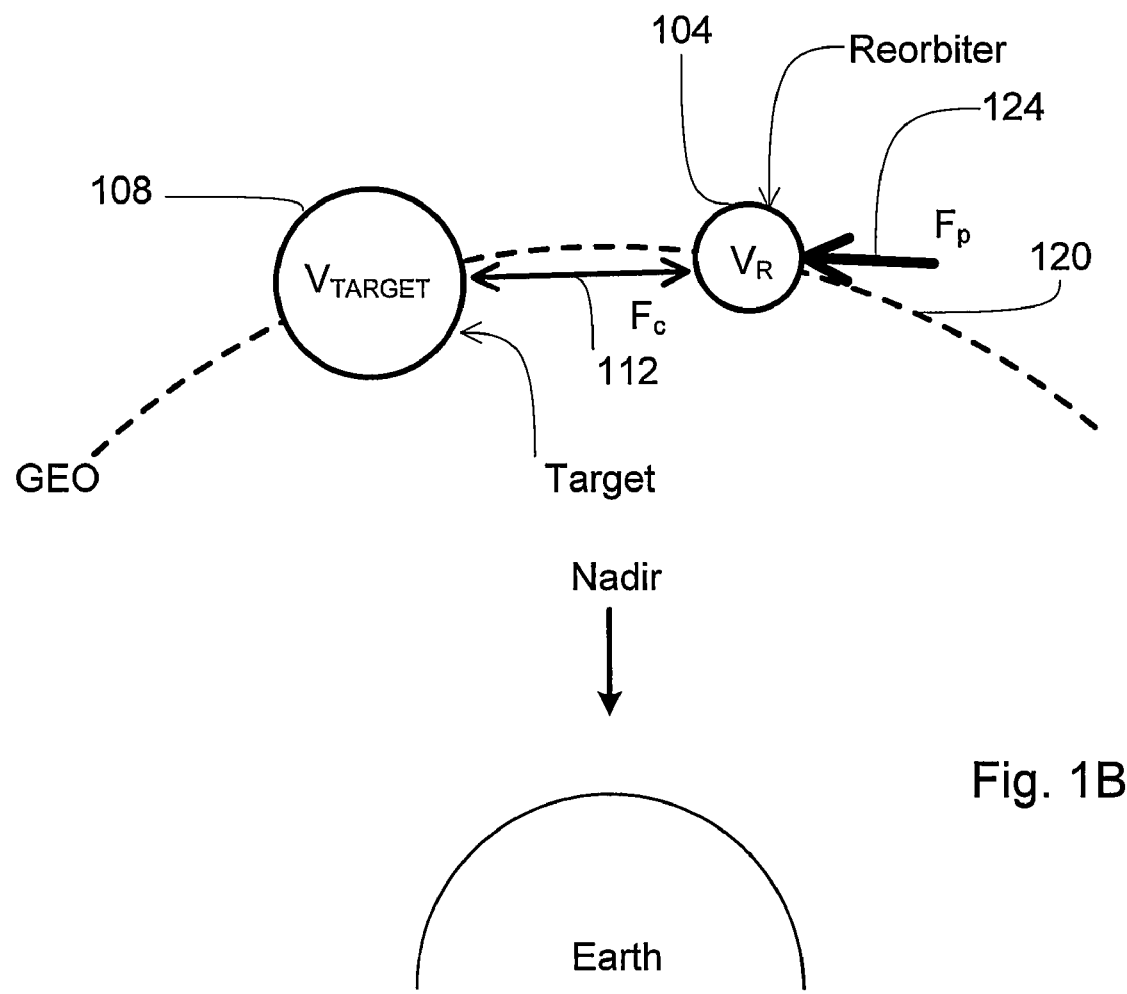

FIG. 1B depicts another configuration between a reorbiter 104 and a target object 108 in accordance with embodiments of the present invention. In particular, the reorbiter 104 has an electric potential or voltage $V_R$ that is of equal charge polarity to the electrical potential or voltage $V_{Target}$ of the target object 108. The equal charge polarity results in a repulsive force between the reorbiter 104 and the target object 108. As shown, the reorbiter 104 is generally trailing the target object 108 orbit 120 in the orbit along-track direction. Because the electrostatic force between the reorbiter 104 and the target object 108 is a repulsive force, the reorbiter 104 pushes the target object 108. In addition, by applying a propulsive force $F_P$ 124, the reorbiter 104 can alter its orbit and the orbit of the target object 108. Similar to the configuration shown in FIG. 1A, the reorbiter of FIG. 1B can use active charge control to create an electrical potential on the reorbiter 104 and/or the target object 108. The resulting electrostatic force between the reorbiter 104 and target object 108 allows the reorbiter 104 to push the target object to a desired location while at the same time maintaining a certain distance between the vehicles.

Figure 1C:
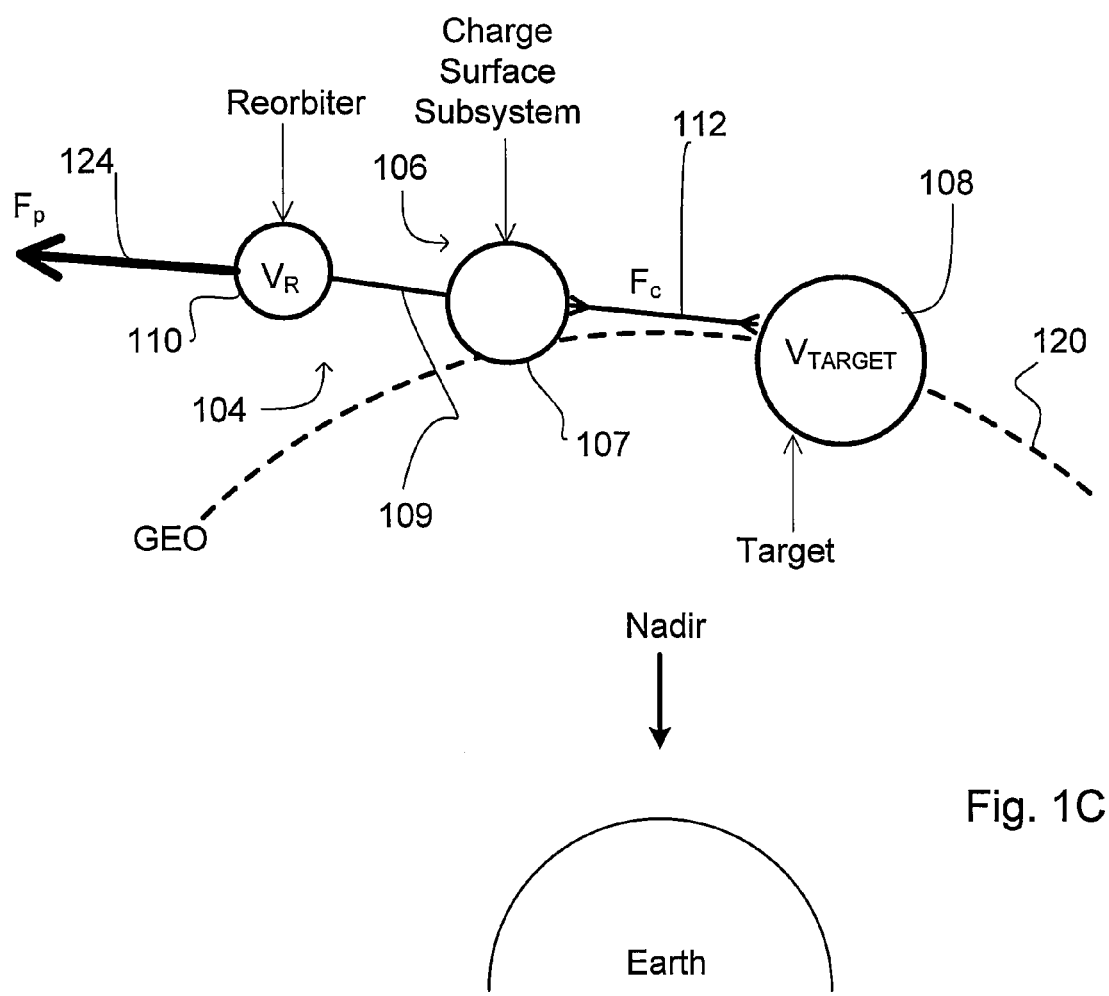

FIG. 1C depicts a reorbiter 104 in accordance with another embodiment of the present invention. In this embodiment, the reorbiter 104 comprises a charge surface subsystem 106 that is capable of creating either attractive or repulsive forces. The charge surface subsystem 106 includes a charge surface 107 voltage $V_R$ that is either opposite the electrical potential or voltage $V_{Target}$ of the target object 108 to create an attractive force, or of equal charge polarity to create a repulsive force. These voltages create an electrostatic force 112 between the charge surface subsystem 106 and the target object 108. To effectuate a pulling motion, the reorbiter 104 leads the target object 108 in the orbit along-track direction. In addition, non-along-track reorbiter positions can be used to create arbitrary electrostatic force directions to help stabilize the target object motion to a desired and new orbit.

The reorbiter 104 can utilize numerous charge surface subsystems 106. For example, the reorbiter 104 may comprise a deployable charge surface subsystem 106, such as a charge surface 107 that is interconnected to a main vehicle bus 110 of the reorbiter 104, by a deployable truss, tether, or other connecting structure 109. In accordance with other embodiments of the present invention, the charge surface subsystem 106 may comprise an inflatable balloon, solar sail, or a lightweight net or membrane. The charge surface subsystem 106 may include any number of structure(s) capable of storing capacitance and being used for charge control. In one embodiment, one charge surface 107 is located approximately 20 to 30 meters away from the main reorbiter bus 110 of the reorbiter 104. This separation distance allows the charge surface 107 to be placed away from the navigation system or other sensitive electronic components of the reorbiter 104. Also, a deployable charge surface subsystem 106 could be retrofitted onto an existing spacecraft that may require that the charge surface 107 be located some distance away from the main spacecraft bus 110. The charge surface 107 may have many different shapes and sizes. In the embodiments shown, the charge surface 107 has a spherical or near spherical shape. However, the charge surface 107 may also comprise a semi-spherical, cylindrical, or other geometric shape conducive to storing a charge. The reorbiter 104 or the charge surface subsystem 106 may comprise a charge generator. In addition, the reorbiter 104 may charge the charge surface subsystem 106 using a wireless charge transfer, such as charge beaming where the reorbiter 104 aims its charge emission at the charge surface subsystem 106 so that the charge surface 107 acquires a charge. Alternatively, the reorbiter 104 can charge the charge surface subsystem 106 by using a wired charge transfer such as a tether or other wired connection. In yet another embodiment of the present invention, the charge surface 107 can acquire a charge by docking with a free flying active charging craft. As shown, the reorbiter 104 utilizes a charge surface subsystem 106 to create a force relative to the target object 108 to pull the target object 108. Similar to other embodiments discussed, by applying a propulsive force $F_p$ 124, the reorbiter 104 can alter its orbit and the orbit of the target object 108.

Figure 1D:
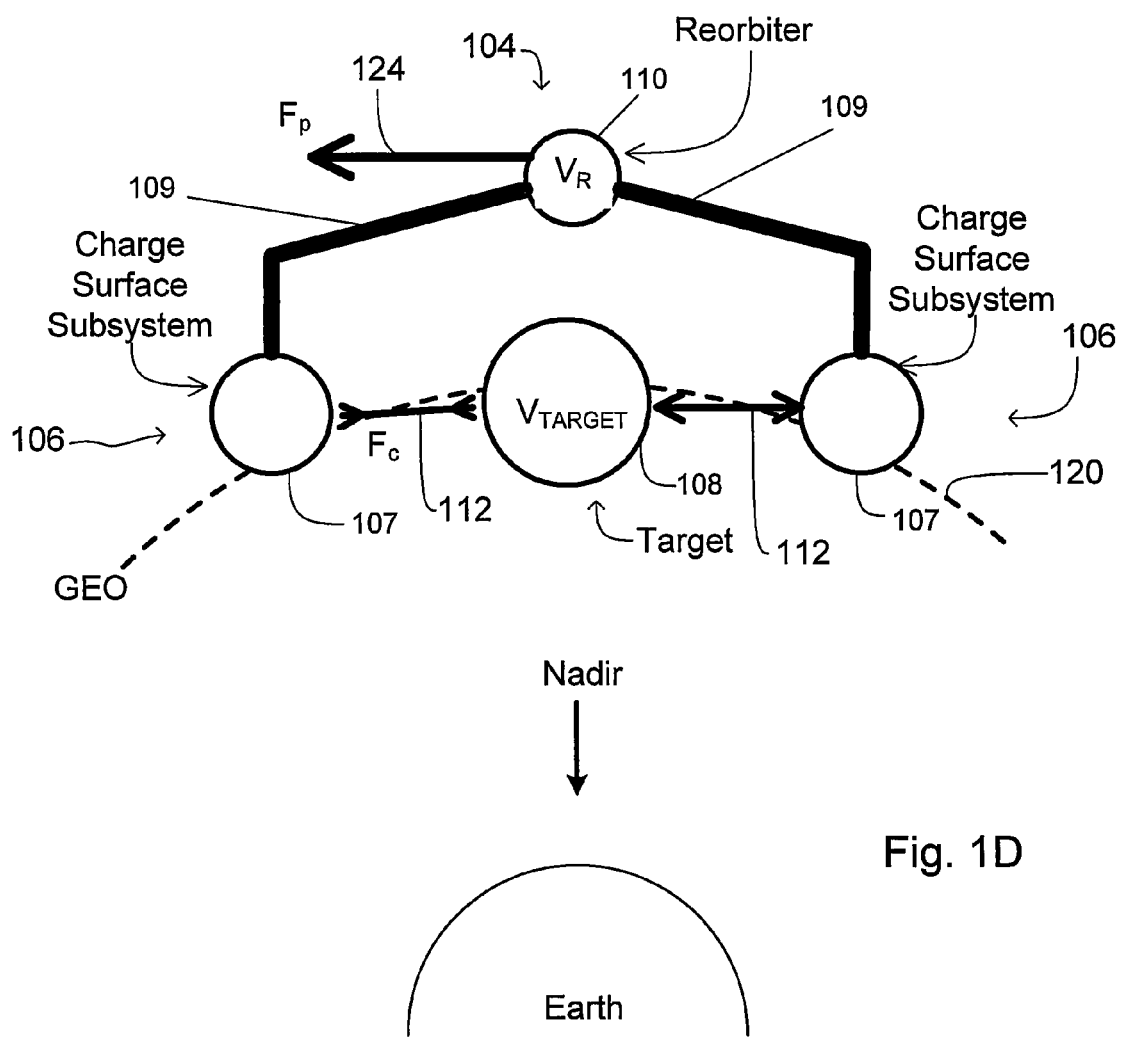

In yet another embodiment of the present invention, FIG. 1D depicts a reorbiter 104 having multiple charge surface subsystems 106 that create combinations of attractive and repulsive forces 112 that can be used to control the target object 108. Depending on whether the electrical potential or voltage of the charge surface subsystems 106 is attractive or repulsive determines whether the resulting electrostatic force between the charge surface subsystems 106 and the target object 108 exerts a pushing or pulling force. As shown, the multiple charge surface subsystems 106 comprise charge surfaces 107 that are interconnected to a main vehicle bus 110 of the reorbiter 104 by a connecting structure 109. The charge surface subsystems 106 create forces relative to the target object 108 to push and/or pull the target object 108. The connecting structures 109 may comprise lightweight deployable booms connected to the main reorbiter bus 110 of the reorbiter 104. Alternatively or in addition, one or more of the connecting structures 109 may comprise a tether. Having multiple charge surface subsystems 106 may be beneficial when capturing an inoperable and/or uncooperative satellite and/or space debris having substantial angular momentum and/or requiring substantial active control. Similar to the embodiments discussed above, by applying a propulsive force $F_p$ 124 (e.g., inertial, cold gas, or electric thrusting) the reorbiter 104 can alter its orbit and the orbit of the target object 108.

Figure 1E:
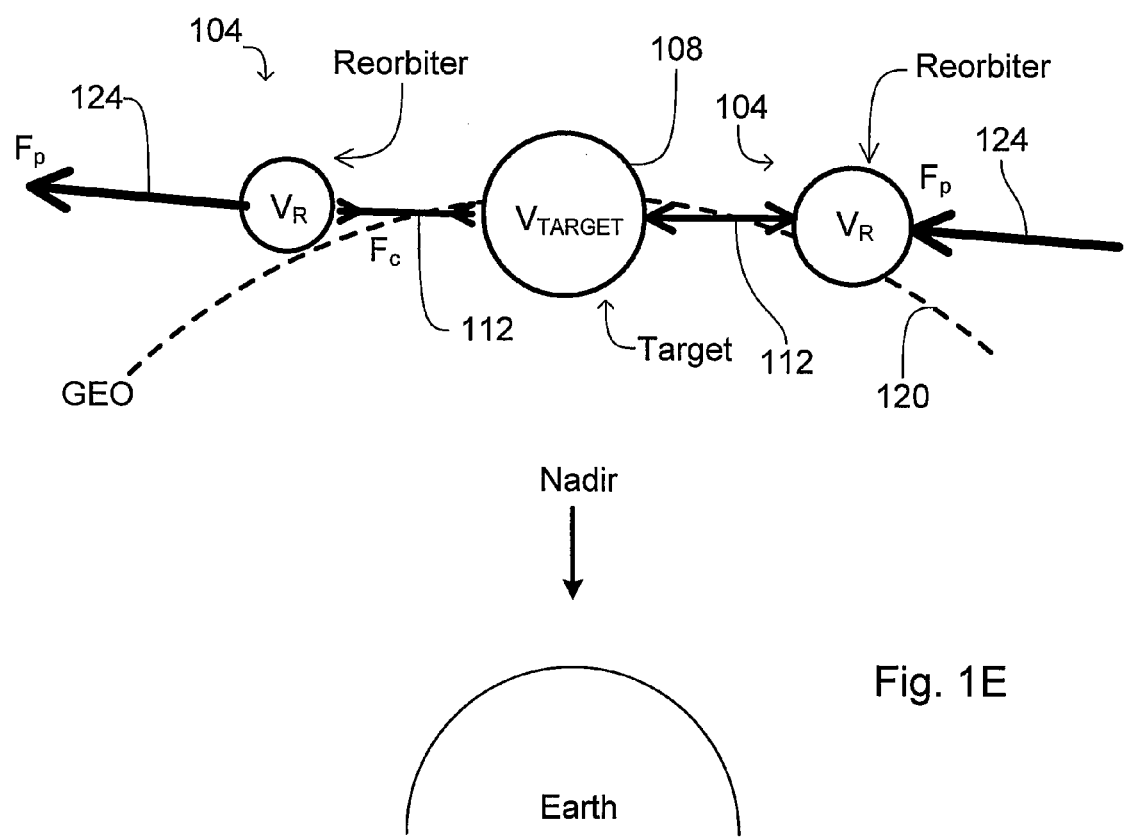

FIG. 1E depicts a plurality of reorbiters 104 in accordance with still other embodiments of the present invention, and the relationship of the reorbiters 104 to a target object 108. Each reorbiter 104 has an electrical potential or voltage $V_R$ that is either opposite the electrical potential or voltage $V_{Target}$ of the target object 108 to create an attractive force, or the same charge polarity as the target object 108 to create a repulsive force. Although not shown, the plurality of reorbiters 104 may also comprise one or more charge surface subsystems. As shown, the reorbiters 104 are generally in the same orbit 120 of the target object 108. In addition, in this example, one of the reorbiters 104 leads (or pulls) the target object 108 in the orbit along-track direction and the other reorbiter trails (or pushes) the target object 108 in the orbit along-track direction. This configuration may be desired for increased control of the target objects 108. As in the embodiments discussed above, by applying a propulsive force $F_p$ 124 the reorbiters 104 can alter their orbits and the orbit of the target object 108. Any number of reorbiters 104 may be used, and in any configuration, in order to move the target object 108. Each reorbiter 104 can apply a propulsive thruster force to move itself while also controlling its own electrostatic potential to achieve the desired interaction with target object 108.

Figure 3A:
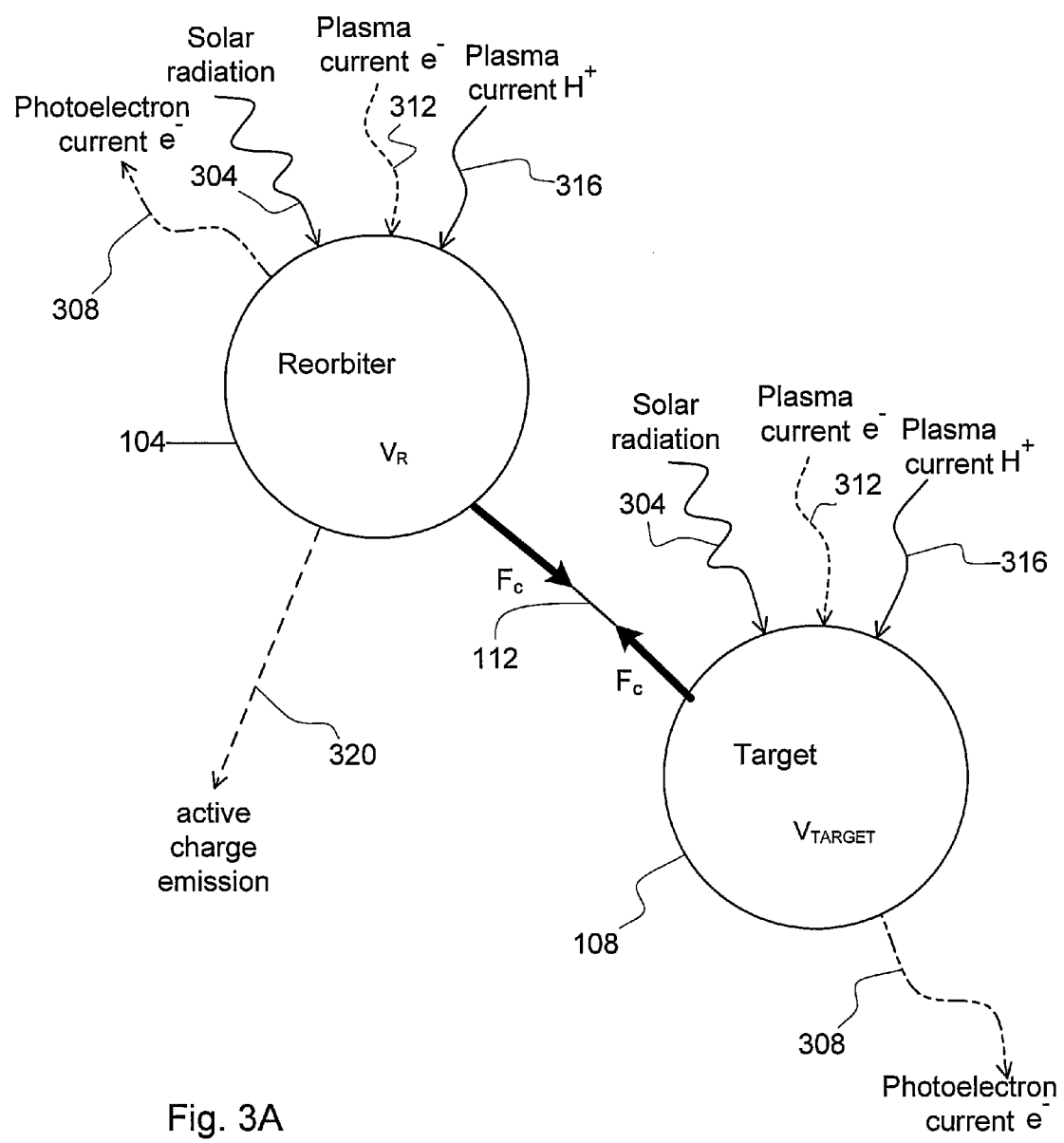
FIG. 3A depicts charge flows relative to a reorbiter and a target object in accordance with embodiments of the present invention.

FIG. 3A depicts various charge flows with respect to the reorbiter 104 and the target object 108. As can be appreciated by one of skill in the art, the voltage or electrical potential of the reorbiter 104 and the target object 108 can change as a result of an imbalance in charge flows. Moreover, there typically is a floating potential at which the electron current and ion current are balanced, resulting in zero net current with respect to the vehicle under consideration. This floating potential is the value that an isolated spacecraft, such as a target object 108 that is not subject to active charge control, would assume in equilibrium. Moreover, the equilibrium voltage potential of a target object 108 is typically negative in shaded orbit regions, and positive in solar illuminated regions. In particular, both the reorbiter 104 and the target object 108 are subject to solar photons 304. The photons impart a positive current by ejecting electrons from the vehicle (e.g., the reorbiter 104 or the target object 108) subject to the solar radiation 304. The electrical potential of a vehicle such as a reorbiter 104 and a target object 108 can also be influenced by a plasma current consisting of electrons 312 and/or a plasma current consisting of positive ions 316. The net effect of the various naturally occurring current flows can result in the subject vehicle acquiring either a positive or a negative electrical potential. Accordingly, the target object can acquire or change an absolute charge due to the target object's interaction with the space environment.

Figure 3B:
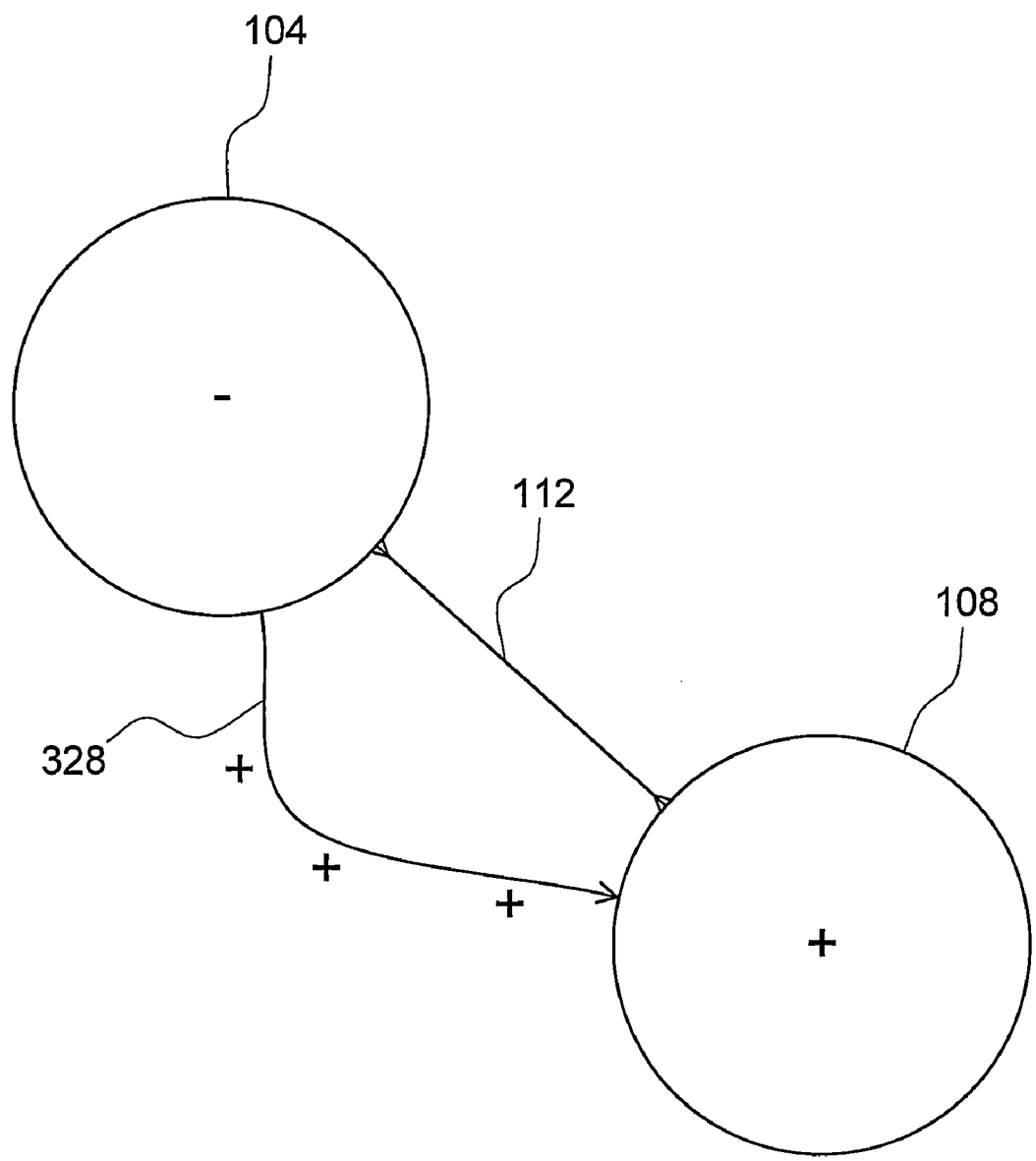
FIG. 3B depicts charge flow relative to a reorbiter and a target object in accordance with further embodiments of the present invention.
Figure 3C:
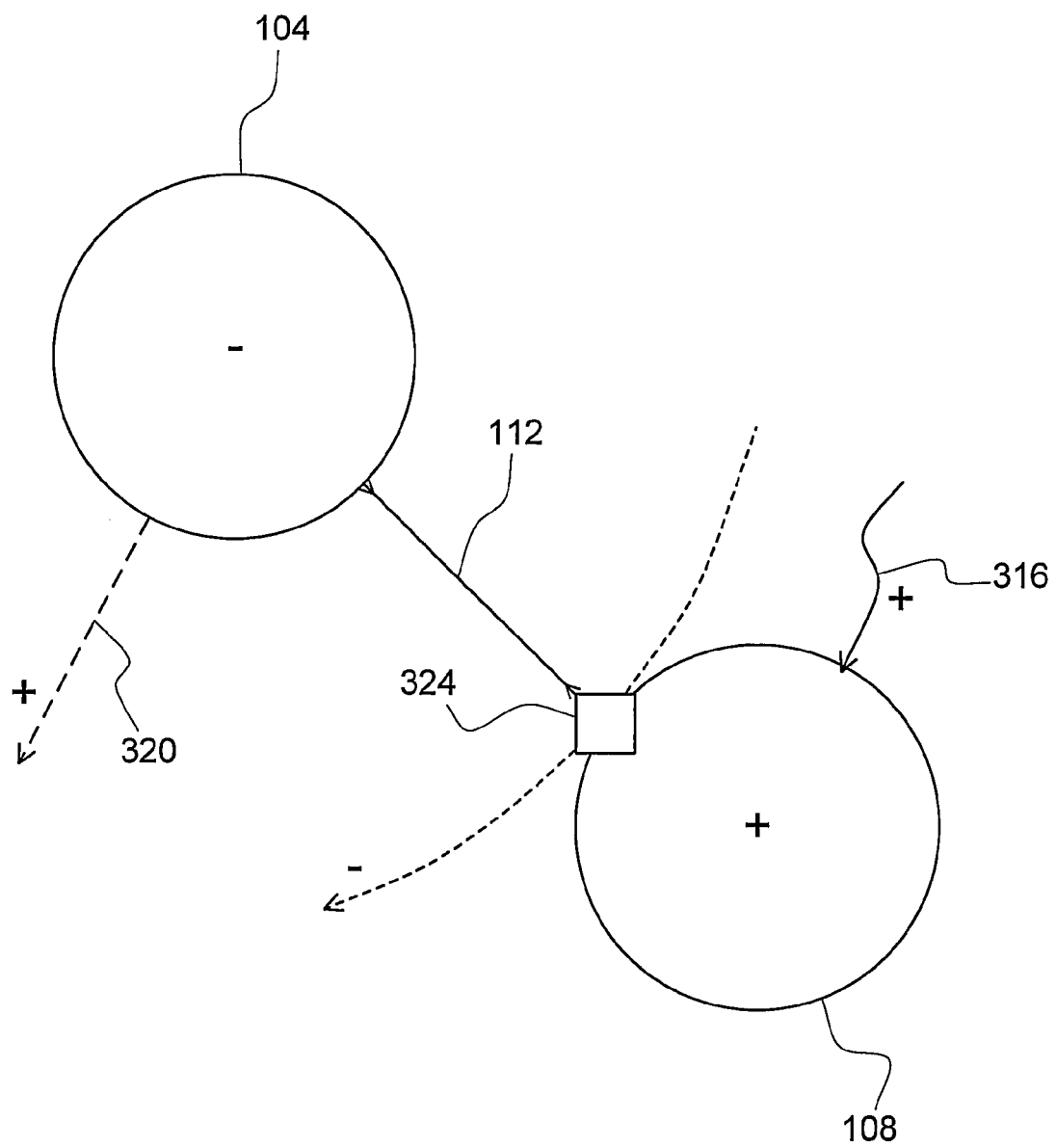
FIG. 3C depicts charge flow relative to a reorbiter and a target object in accordance with still further embodiments of the present invention.

A reorbiter 104 in accordance with embodiments of the present invention includes an active charge control mechanism that is capable of producing an active charge emission current 320. The active charge emission current can include a flow of electrons, or can include a flow of positive ions. Accordingly, regardless of the voltage potential of the target object 108 due to imbalances in the current flows with respect to the target object 108, and the voltage potential imparted by naturally occurring current flows to the reorbiter 104, an active charge emission current 320 can be used to impart an electrical potential to the reorbiter 104 that is either opposite or equal in polarity with respect to the electrical potential of the target object 108, to establish an electrostatic force 112 between the reorbiter 104 and the target object 108. In accordance with further embodiments of the present invention, the reorbiter 104 can change the absolute charge of the target object 108 by imparting an additional charge to the target object 108 by using wireless or wired charge transfer mechanisms. The reorbiter 104 may change the absolute charge of the target object 108 by using wireless charge beaming to aim the reorbiter charge emission 320 at the target object 108 so that the target object changes or acquires an absolute charge. In accordance with further embodiments of the present invention, and as depicted in FIG. 3B, the reorbiter 104 may change the absolute charge of the target object 108 by using a tether 328 or other wired connection to control the charge on the target object 108. A charged reorbiter 104 and target object 108 can be obtained by using a physically conducting wire/tether 328 that extends between the target object 108 and a voltage source (not shown) provided as part of the reorbiter 104. In accordance with still further embodiments of the present invention, the absolute charge of the target object 108 may be changed using other charge transfer mechanisms, such as by using a free flying charge control device 324. As depicted in FIG. 3C, a free flying charge control device 324 with active charge emission capability can be launched from the reorbiter 104 or some other platform and approach and physically dock with the target object 108 in order to change the absolute potential of the target object 108.

Figure 4:
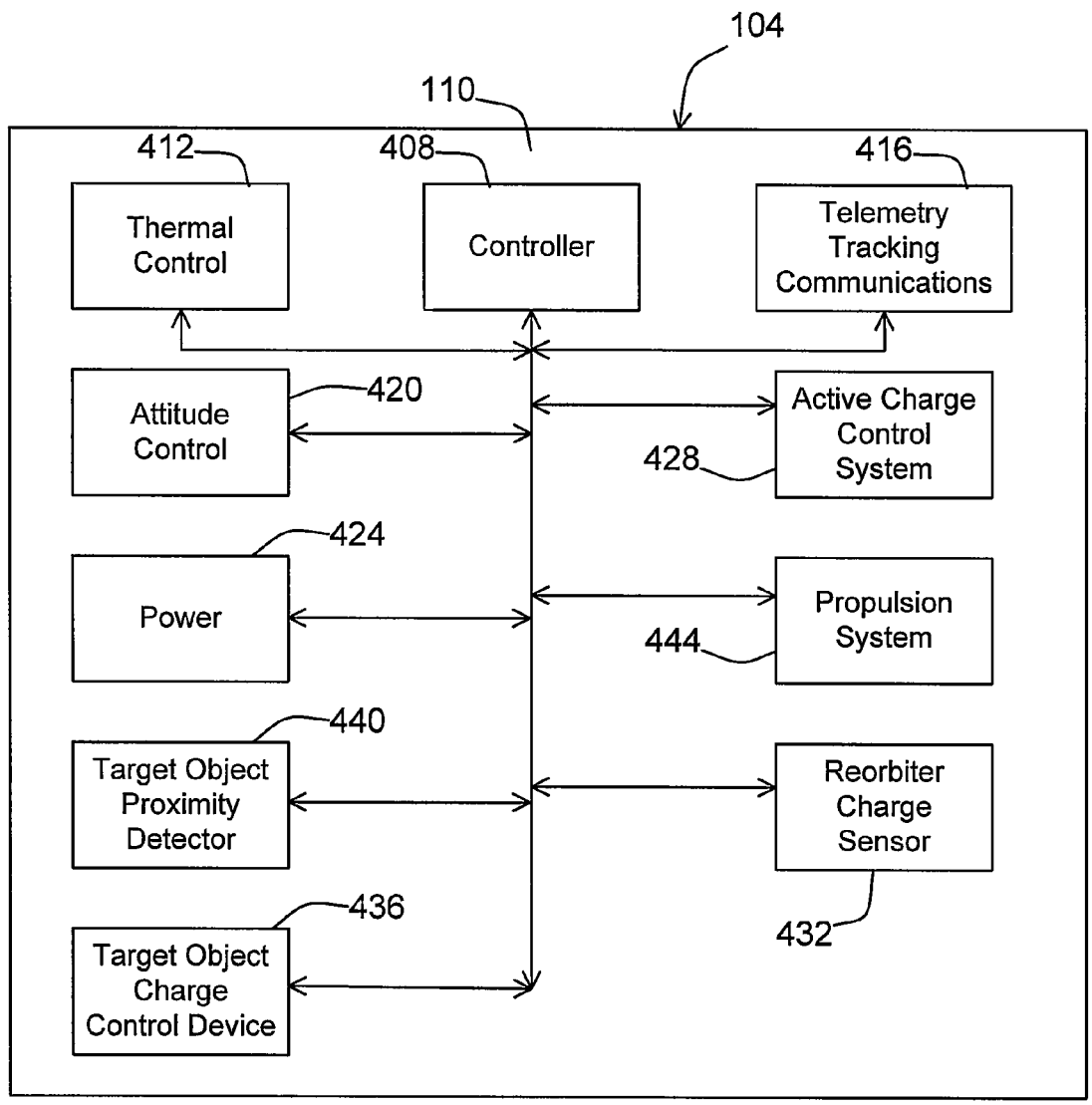
FIG. 4 depicts components of a reorbiter in accordance with embodiments of the present invention.

FIG. 4 depicts components of a reorbiter 104 in accordance with embodiments of the present invention. In general, the reorbiter 104 includes a vehicle bus 110, to which the various components of the reorbiter 104 are interconnected. For example, the reorbiter 104 can include components that are typical to satellites or other space vehicles generally. Examples of such components include a controller 408, a thermal control system 412, a telemetry, tracking and communications system 416, an attitude control system 420 and a power supply 424. In addition, a reorbiter 104 in accordance with embodiments of the present invention includes an active charge control mechanism or system 428. The reorbiter 104 can also include a reorbiter charge sensor 432, and/or a target object charge control device 436. However, this is not strictly required. The Coulomb force $F_c$ is proportional to the charge product $q_1 q_2$, which can be estimated by measuring the relative motion of the vehicles. In addition, the reorbiter 104 may include a target object proximity detector 440 that can be used to determine the relative position of a target object 108. The electrical potential of the target spacecraft may be estimated by analyzing the local space environment. Alternatively, the polarity and charge level of the target object 108 may be estimated by determining a relative motion response from a separation distance L between the reorbiter 104 and the target object 108. The reorbiter 104 also includes a propulsion system 444.

As can be appreciated by one of skill in the art, the vehicle bus 110 comprises the physical or supporting structure of the reorbiter 104 satellite. Accordingly, the vehicle bus 110 can comprise mounting points or interconnections for various other components. The controller 408 may comprise a general purpose programmable processor, or an application specific integrated circuit (ASIC), alone or in combination with associated memory. The controller 408 may operate to control operation of the reorbiter 104 generally, for example by executing programming code or instructions. Moreover, the controller 408 may perform other functions, alone or in combination with various physical hardware, to provide or support for various functions performed by components of the reorbiter 104. The thermal control system 412 generally operates to maintain the temperature of components of the reorbiter 104 within an acceptable operating range. The telemetry, tracking and communication system 416 supports the provision of telemetry and location information from the reorbiter 104 to a ground station or another spacecraft, and to receive control information. Accordingly, the telemetry, tracking and communication system 416 may comprise provision for radio frequency and/or optical communications, and location and pose determination sensors. The power system 424 may comprise sources of electrical power, including batteries and solar panels.

The active charge control system 428 generally functions to produce an active charge emission current 320 to alter the electrical potential $V_R$ of the reorbiter 104. For example, where the electrical potential of the reorbiter 104 is to be made more negative (or less positive), the active charge control system 428 may operate to produce an active charge emission current 320 consisting of positively charged ions. Conversely, where the electrical potential of the reorbiter 104 is to be made more positive (or less negative), the active charge control system 428 may be operated to create an active charge emission current 320 consisting of negatively charged electrons.

The optional target charge control device 436 may be used to alter the electrical potential $V_{Target}$ of the target object 108. For example, the target charge control device 436 may include wired charge transfer devices, such as a tether 328 or other wired connection that is capable of attaching to the target object 108 and altering the absolute potential of the target object 108. Alternatively, the target charge control device 436 may include a free flying charge control device 324 having active charge emission capability. The free flying charge control device 324 may be operated to be deployed from the reorbiter 104, approach the target object 108, and then dock with the target object 108. Once docked or attached to the target object 108, the free flying charge control device 324 can perform active charge emission to change the absolute potential of the target object 108.

Figure 5:
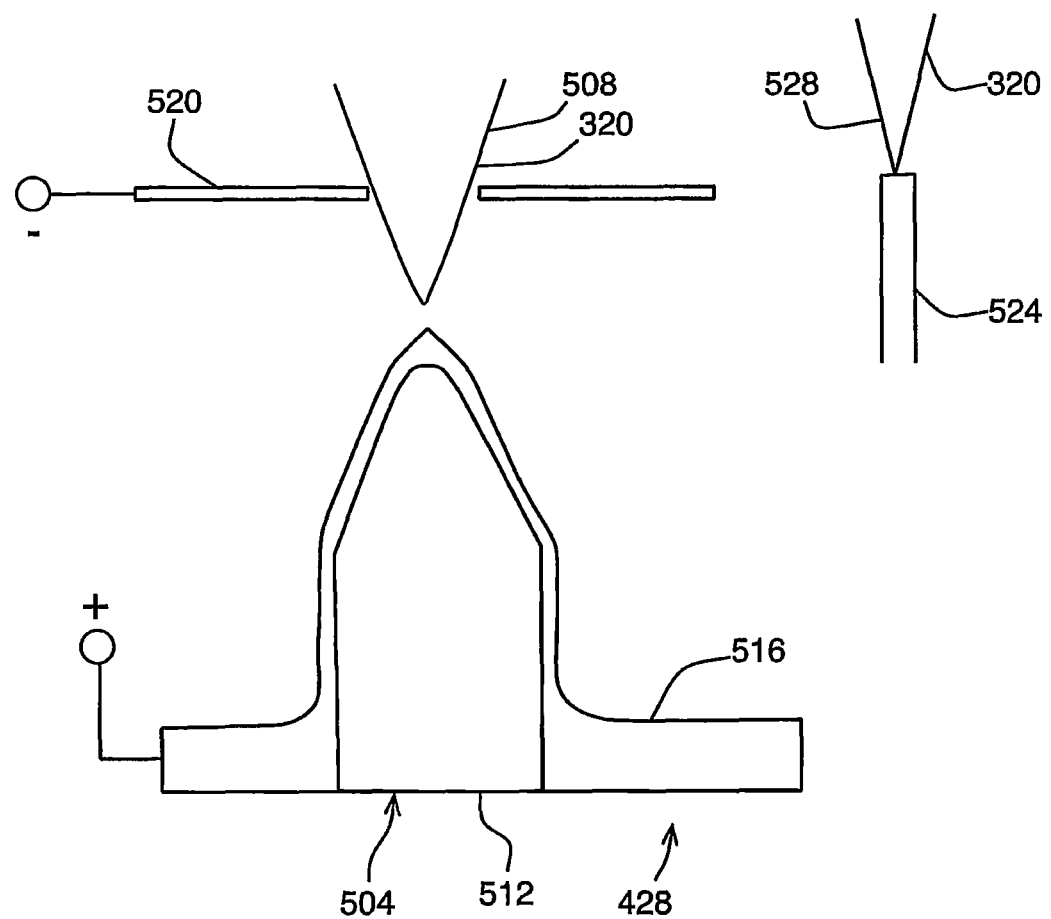
FIG. 5 depicts an active charge control system of a reorbiter in accordance with embodiments of the present invention.

FIG. 5 depicts components of an exemplary active charge control system 428 in accordance with embodiments of the present invention. In this exemplary embodiment, the active charge control system 428 includes an ion source 504. The ion source 504 comprises a needle type liquid metal ion source. The ion source 504 effects a positive active charge emission 320 by producing a beam of gaseous ions or an ion beam 508. More particularly, the ion source 504 includes a needle 512 mounted within a reservoir of an ion source charge material 516. The ion source charge material is placed in a molten state, with a thin film of the ion source charge material coating the needle 512. A relatively high voltage (e.g., about 6 kV) is applied between the liquid ion source charge material 516 and an accelerator electrode 520. At the tip of the needle 512, the local electric field reaches values on the order of volts per nanometer, resulting in the production of the ion beam 508 that functions as the active charge emission current 320. Various materials may be used as the ion source charge material 516. One example of a suitable ion source charge material 516 is Indium.

In accordance with further embodiments of the present invention, the active charge control system 428 may additionally or alternatively include a cathode 524 for producing an active charge emission current 320 comprising a stream of electrons 528. The cathode 524 may, for example, comprise a field emission cathode.

Figure 6:
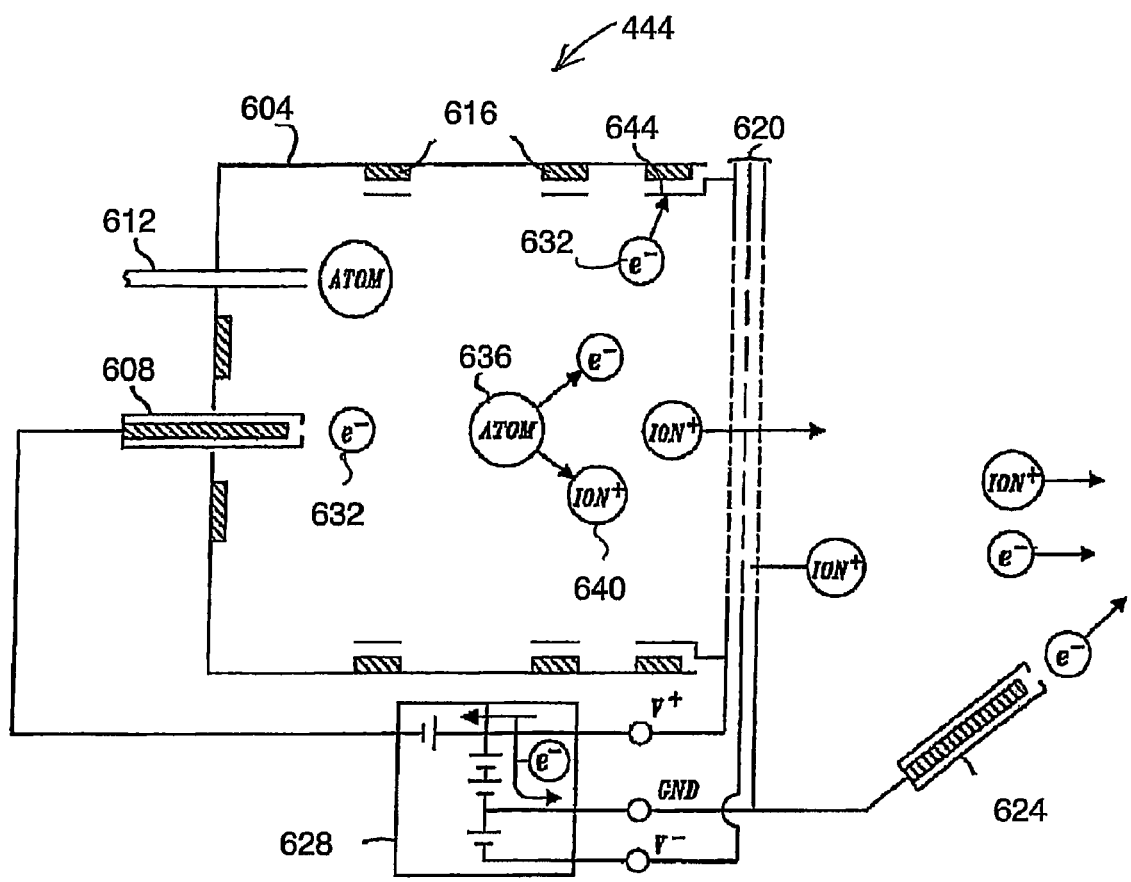
FIG. 6 depicts a propulsion system of a reorbiter in accordance with embodiments of the present invention.

FIG. 6 depicts a propulsion system 444 in accordance with one embodiment of the present invention. In this exemplary embodiment, the propulsion system 444 is an ion engine or thruster 604. The ion engine 604 includes an impulse cathode 608, a propellant inlet 612, magnets 616, and an ion optic system 620. The ion engine 604 may additionally include a neutralizer cathode 624. The ion engine 604 may include or be associated with a power supply 628.

In operation, the impulse cathode 608 produces electrons 632 that impact atoms 636 introduced by the propellant inlet 612 to the interior of the ion engine 604. As can be appreciated by one of skill in the art, the inlet 612 receives propellant from a propellant tank (not shown). The impact of the ions 632 with the gas atoms 636 ionizes the atoms 632, producing ions 640 in a diffused plasma. An anode 644 collects electrons 632, raising the positive electrical potential of the plasma. The magnets 616 act to inhibit electrons and ions from leaving the plasma. The ions 640 are ejected from the ion engine 604 through the ion optic system 620, as a result of the voltage difference between the grids of the ion optic system 620, generating thrust. Electrons collected at the anode 644 can be injected into the ion beam exhaust of the ion engine 604 via the neutralizer cathode 624.

In other embodiments of the present invention, the propulsion system 444 may comprise any type of rocket engine propulsion system or any combination thereof. For example, the propulsion system 444 may comprise known solid, liquid or hybrid rocket engines, inertial thrusters and/or micro-thrusters. In one embodiment of the present invention, the propulsion system 444 utilizes fuel efficient micro-thrusters to move (tug, pull, or combinations thereof) the target object 108 out of a GEO slot and into a disposal orbit. In another embodiment of the present invention, a chemical propulsion system is used. In yet other embodiments of the present invention, electric propulsion systems other than an ion engine are employed. Liquid fuel propulsion systems may also be used in other embodiments of the present invention. Thus, the reorbiter may utilize many propulsion systems 444, or combinations thereof, depending on the mission requirements and/or other mission constraints, in order to obtain the desired propulsive force. As one of skill in the art will appreciate, the chosen propulsion system 444 is preferably lightweight, fuel efficient, and should not have an adverse influence on the electrostatic charge control of the target object 108 and the reorbiter 104.

The optional reorbiter charge sensor 432 operates to determine the electrical potential of the reorbiter 104. While not strictly required, it can simplify the control algorithm by providing direct knowledge of the reorbiter charge level. Various devices or device configurations may be used in implementing the reorbiter charge sensor 432. For example, the charge on an electrically isolated charge plate can be measured. In such a configuration, an externally mounted surface charge detector is used to determine the electrical potential of the exterior of the reorbiter 104, while an internal charge plate or monitor is used as a reference voltage. As another example, a photo-emission based charged sensor that uses the photo-emission from a photo-emitting conductive plate is used as a reference point.

A target object proximity detector or sensor 440 measures the separation distance between the reorbiter 104 and a target object 108. As an example, the target object proximity detector 440 may comprise a laser range finder or light detection and ranging (LIDAR) system.

Figure 7:
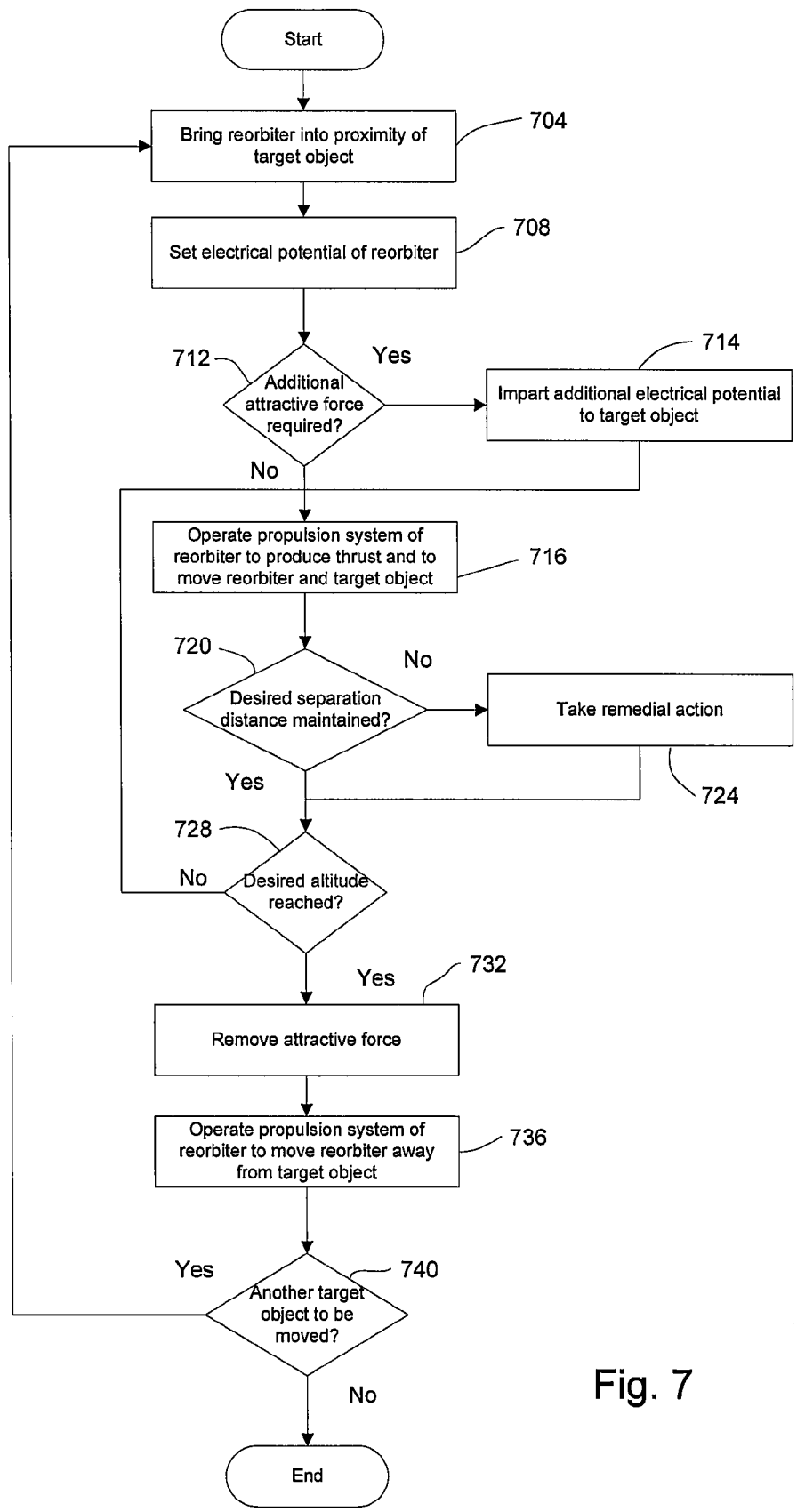
FIG. 7 is a flowchart depicting aspects of a method for altering an orbit of a target object using a reorbiter in accordance with embodiments of the present invention.

FIG. 7 depicts aspects of a method for altering an orbit of a target object using a reorbiter in accordance with embodiments of the present invention. Initially, the reorbiter is brought into proximity with the target object (step 704). Bringing the reorbiter into the vicinity of the target object can include placing the reorbiter into a slightly higher orbit than the target object, and coming to within a range of about 10 to 50 meters of the target object. In accordance with embodiments of the present invention, the reorbiter 104 is maneuvered into proximity with the target object using the onboard propulsion system 444, which can comprise an engine or thruster 604. Accordingly, the reorbiter 104 will have already been placed into orbit, for example by a conventional chemical rocket. In addition, placing the reorbiter 104 into proximity with the target object 108 can include obtaining range information from a target object proximity detector 440, in order to determine when the reorbiter 104 is at a desired distance from the target object 108. As can be appreciated by one of skill in the art after consideration of the present disclosure, the desired distance is one that is close enough to establish an electrostatic force 112 of sufficient strength to effect the desired altitude change of the target object 108, while maintaining separation between the reorbiter 104 and the target object 108, for instance to avoid an electrostatic discharge between the vehicles 104 and 108, and to avoid direct physical contact between the vehicles 104 and 108. Placing the reorbiter 104 into proximity with the target object 108 can additionally include operation of the telemetry, tracking and communications system 416, and the attitude control system 420, to ensure that the reorbiter 104 is properly aligned with respect to the target object 108, and to impart a force to the target object 108 in a desired direction.

At step 708, the electrical potential of the reorbiter 104 is set. More particularly, the electrical potential of the surface of the reorbiter 104 is controlled such that it is either opposite or equal in polarity of the electrical potential of the target object 108 to create either an attractive force, repulsive force, or a combination of attractive and repulsive forces to change the target object orbit. For example, if the target object 108 has a negative electrical potential, the active charge control system 428 may be operated to impart an overall positive electrical potential to the reorbiter 104 to field an attractive electrostatic force used to pull the target object. A negative reorbiter 104 potential in this example would yield a repulsive electrostatic force used to push at the target object 108. Operation of the active charge control system 428 may be in cooperation with a target object proximity detector 440 that may be used to determine the relative motion of the vehicles and consequently the relative position of the target object 108. That is, the target object proximity detector 440 may be used to estimate the polarity and charge level of a target object 108 by determining the separation distance L between the reorbiter 104 and the target object 108 over time. In addition, a determination can be made as to whether control of the electrical potential of the reorbiter 104 alone will establish a sufficient electrostatic force 112 between the reorbiter 104 and the target object 108 (step 712). If a greater electrostatic force is required, an electrical charge can be imparted to the target object 108 (step 714). For example, if the electrical potential of the target object 108 is only slightly negative, it can be made more negative by directing a beam of electrons from the reorbiter 104 to the target object 108. In particular, by directing a stream of electrons at the target object 108, the target object 108 will acquire a more negative charge. The stream of electrons may be supplied by a cathode, for example by a cathode provided as part of the active charge control system 428 or the propulsion system 444 of the reorbiter 104. At the same time, absent any counteracting current, the reorbiter 104 will become more positive, enhancing the electrostatic force 112 between the reorbiter 104 and the target object 108. Alternatively, where the electrical potential of the target object 108 is to be made more positive, a stream of ions may be directed towards the target object 108. Where a beam of positively charged ions is desired, such a beam may be provided by the active charge control system 428 and/or the propulsion system 444 of the reorbiter 104. In another example, the target object charge control device 436 may be used to change the absolute charge of the target object 108. For example, the target object charge control device 436 can impart an additional electrical charge to the target object 108 by using a tether 328 or other wired connection or by using a non-tethered, free flying charge control device 324. As such, the target object charge control device 436 may be used to control the absolute charge on the target object 108 to maintain or to help maintain a desired electrostatic force 112.

After controlling the electrical potential of the reorbiter 104, and/or imparting charge to the target object 108, the propulsion system of the reorbiter 104 may be operated to produce thrust $F_p$ 124 (see FIG. 1) (step 716). In general, by applying thrust the altitude of the reorbiter 104 and the target object 108 can be altered. Specifically, the thrust from the propulsion system 444 may operate on the reorbiter directly 110, while the thrust 124 from the propulsion system 444 may operate on the target object 108 via the electrostatic force 112. In accordance with embodiments of the present invention, the application of thrust using the propulsion system 444 is done in a way that increases the altitude of the reorbiter 104 and the target object 108 gradually, such that the target object 108 is brought to a desired altitude over a number of orbital periods.

At step 720, a determination is made as to whether a desired separation distance between the reorbiter 104 and the target object 108 is being maintained. If the desired separation distance is not being maintained, remedial action can be taken (step 724). For example, the electrostatic force $F_c$ 112 can be altered by altering the electrical potential of the reorbiter 104 and/or the target object 108. Alternatively or in addition, the thrust $F_p$ 124 provided by the propulsion system 444 can be altered or discontinued.

After determining that a desired separation distance between the reorbiter 104 and the target object 108 is being maintained, or after making adjustments or otherwise taking remedial action to maintain or reestablish a desired separation, a determination may be made as to whether the target object 108 has reached the desired altitude (step 728). If the desired altitude has not been reached, the process may return to step 716. If the target object 108 has reached the desired altitude, the active charge control system 428 of the reorbiter 104 may be operated to place the reorbiter 104 at or near the electrical potential of the target object 108, to remove the electrostatic force $F_c$ 112 (step 732). The reorbiter 104 can then use its propulsion system 444 to move away from the target object 108 (step 736).

At step 740, a determination may be made as to whether there is another target object 108 to be moved by the reorbiter 104. If another target object 108 that needs to be moved has been identified, the process may return to step 704. If no additional target objects are identified, the process may end. For example, the reorbiter 104 can remain in orbit, until a next target object 108 is identified. Although the aspects of the method discussed in connection with FIG. 7 present steps in a particular order, it should be appreciated that the illustrated exemplary order is not required. In addition, at least some of the illustrated steps can be performed continuously or during tug/pull operations. For example, monitoring whether a desired separation distance is being maintained can be performed continuously while the reorbiter 104 is towing/pushing a target object 108. Moreover, any necessary remedial action to maintain or reestablish a desired separation distance can be performed continuously.

Although a target object 108 may comprise a defunct satellite or satellite at its end of life that is to be removed to a new orbit, embodiments of the present invention are not so limited. For example, a reorbiter 104 in accordance with embodiments of the present invention may be operated to reposition satellites equipped with charge control to new orbits. In addition, a target object 108 is intended to include debris that is to be moved to a new orbit. For instance, pieces of a satellite that for one reason or another has broken up, or components that have served their function and are no longer operable, such as spent booster rocket sections, can be target objects 108 that are moved to a new orbit by a reorbiter 104 in accordance with embodiments of the present invention. The ability of the reorbiter 104 is disclosed herein to move target objects 108 comprising debris, even debris that is small in size but nonetheless presents a hazard to other spacecraft, highlights one of the advantages of the reorbiter 104 of the present invention. In particular, the ability to act on and move a target object 108 without coming into direct physical contact with the target object 108 allows the reorbiter 104 to maintain a safe separation distance from the target object 108, and to operate on the target object 108 even if that target object 108 is in an uncontrolled spin, is devoid of features that can easily be grasped, and/or is broken into multiple pieces.

As described herein, the electrostatic spacecraft reorbiting system uses a reorbiter 104 and a combination of electrostatic and inertial thrusting to simultaneously reorbit a target object 108 to a new orbit while maintaining a nominal separation distance L to the target object 108. The reorbiter 104 is able to change the target object's inertial orbit. In addition, the reorbiter 104 actively changes the system center of mass by using a propulsive thrust $F_p$ to change the system center of mass altitude. In addition, the reorbiter 104 utilizes active charge control. Moreover, charge can be imparted by the reorbiter 104 to the target object 108, in some manner, to create the required electrostatic actuation or force 112 without the direct assistance or cooperation of the target object 108.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A reorbiter, comprising:
an active charge control system, wherein a desired surface potential of the reorbiter is maintained by the charge control system for at least a first time interval while the reorbiter is in space, wherein the reorbiter potential is held at a non-zero value to create an electrostatic force to allow a target object to be moved by the reorbiter during the first time interval, and wherein the active charge control system establishes an electrostatic force between the reorbiter and the target object; and
a propulsion system, wherein a propulsive thrust is provided while the electrostatic force is established to change a location of the reorbiter and the target object.

2. The reorbiter of claim 1, wherein the active charge control system includes an ion source.

3. The reorbiter of claim 1, wherein the active charge control system includes an electron source.

4. The reorbiter of claim 1, wherein the active charge control system and the propulsion system include a shared ion source.

5. The reorbiter of claim 1, wherein the active charge control system and the propulsion system include a shared electron source.

6. The reorbiter of claim 1, wherein the active charge control system and the propulsion system include a shared ion source and a shared electron source.

7. The reorbiter of claim 1, wherein the active charge control system includes an ion emitter.

8. The reorbiter of claim 1, wherein the propulsion system includes an engine.

9. The reorbiter of claim 1, further comprising:
a reorbiter charge sensor, wherein the reorbiter charge sensor is operable to determine a potential of the reorbiter.

10. The reorbiter of claim 1, wherein the location is a formation center of mass of the reorbiter and the target object.

11. A method for changing an altitude of a target spacecraft, comprising:
placing a reorbiter into proximity with a target object;
controlling an electrical potential of the reorbiter, wherein the electrical potential of the reorbiter is set to a charge polarity to create at least one of an attractive force and a repulsive force between the reorbiter and the target object;
after establishing the electrostatic force between the reorbiter and the target object, applying a propulsive force, wherein the propulsive force is applied while the at least one of an attractive force and a repulsive force is established to change an altitude of the target object.

12. The method of claim 11, further comprising:
sensing an electrical potential of the reorbiter.

13. The method of claim 11, further comprising:
estimating an electrical potential of the target object by determining a relative motion response from a separation distance between the reorbiter and the target object.

14. The method of claim 11, further comprising:
changing an absolute electrical potential of the target object by controlling the charge of the target object.

15. The method of claim 11, wherein controlling an electrical potential of the reorbiter includes at least one of:
emitting positive ions from the reorbiter;
emitting negative electrons from the reorbiter.

16. The method of claim 11, wherein applying a propulsive force includes operating an engine.

17. The method of claim 11, wherein controlling an electrical potential of the reorbiter includes emitting positive ions from an ion emitter provided as part of the reorbiter, and wherein applying a propulsive force includes emitting positive ions from the ion emitter.

18. The method of claim 11, wherein the altitude of the reorbiter and the target object is changed to a higher altitude over a plurality of orbital periods about the Earth.

19. The method of claim 11, wherein controlling the electrical potential of the reorbiter includes:
sensing a potential of the reorbiter;
activating a charge emitter to alter the electrical potential of the reorbiter.

20. A reorbiting system, comprising:
a reorbiter, the reorbiter including:
an active charge control system;
a propulsion system;
a target object, wherein the active charge control system of the reorbiter is operated to establish an electrostatic force between the reorbiter and the target object, and wherein the propulsion system of the reorbiter is operable while the active charge control system is established to move the reorbiter and the target object.

21. The system of claim 20, wherein the propulsion system includes an engine.

* * * * *